GRAFT POLYMERS OF RUBBER FOR REINFORCING PLASTICS
Filed Nov. 14, 1969 2 Sheets-Sheet 1
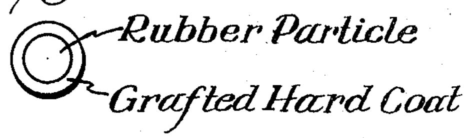
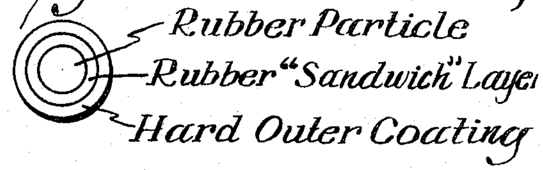
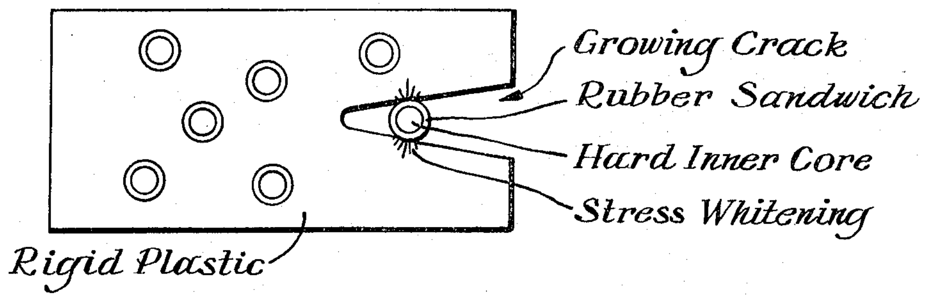
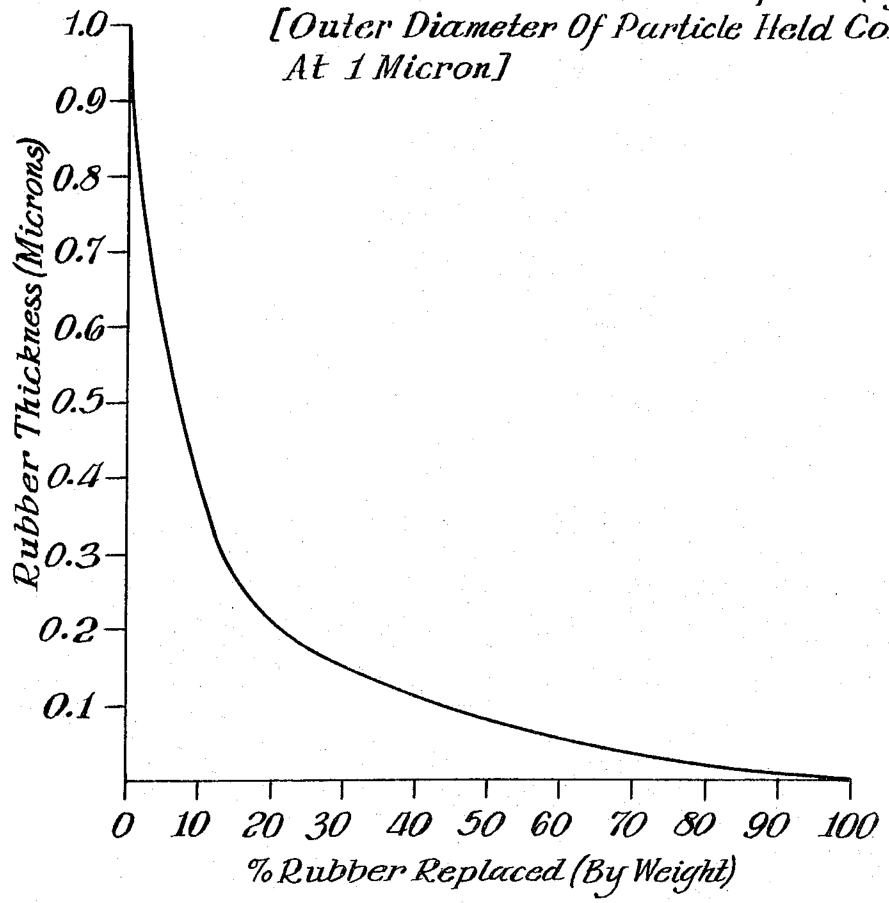

3,661,994

GRAFT POLYMERS OF RUBBER FOR REINFORCING PLASTICS

Jesse C. H. Hwa, Stamford, Conn., and Ruth E. Gallagher, Dobbs Ferry, N.Y., assignors to Stauffer Chemical Company, New York, N.Y.

Filed Nov. 14, 1969, Ser. No. 876,928
Int. Cl. C08f *15/00, 19/00*
U.S. Cl. 260—879 2 Claims

ABSTRACT OF THE DISCLOSURE

Controlled emulsion polymerization provides multilayered particles comprising a hard polymeric core, a coating of rubber and, if desired, one or more hard outer polymeric coating. These rubber-containing "sandwich" polymer particles are useful particularly as high impact plastics and modifiers to reinforce relatively rigid types of plastics.

BACKGROUND OF THE INVENTION

It is a common practice to reinforce such rigid plastics as polyvinyl chloride, polymethyl methacrylate, polystyrene, styrene-acrylonitrile copolymers and the like, with particles of rubber polymers such as polybutadienes and polyacrylates. The addition of rubber to these common plastics improves their impact strength, that is, their ability to withstand a rapidly applied shock. While the addition of rubber improves the impact strength of these plastics, their other physical properties such as tensile strength, clarity, heat distortion temperature, hardness and aging stability are, however, adversely affected by the rubber. In most cases, the addition of the larger amounts of rubber which would produce the maximum amount of impact strength results in a plastic that is too soft for many uses. The common commercial products, then, are a compromise between the desire to increase impact strength while being able to maintain their other necessary physical properties.

Many references exist which describe how to prepare rubber-reinforced plastics. The rubber particles can be dispersed in the rigid phase by mill blending or latex blending, or by polymerizing the hard polymer in the presence of the rubber. The rubber has been shown to exist in the hard polymer matrices as discrete particles of about 0.1 to 5 microns in diameter. The mechanism of rubber reinforcement is not completely understood but the rubber particles are believed to act either as deflectors of a growing crack or as stress concentrators from which stress-whitening, i.e. cold-drawing, can be initiated. By either of these methods the energy of a growing crack in the continuous, hard plastic phase may be dissipated safely.

These theories indicate that only the outer portion of the rubber particles functions in rubber reinforccement. It has generally been found that for a given amount of rubber there is an optimum rubber particles size range which for most plastics appears to be on the order of 0.25 to 2 microns. The particles should not be smaller than the radius of an incipient crack, nor should they be so large that there are too few of them in a given rubber load to encounter and check the cracks. In many cases the efficiency of rubber reinforcement has been improved by grafting, i.e. chemically bonding, a hard polymeric coating around the rubber core. The hard material is usually more compatible, i.e. soluble, in the continuous phase and the graft is believed to function by improving the adhesion between the rubber particles and the continuous phase.

SUMMARY OF THE INVENTION

This invention concerns a method by which there has been further improved the efficiency of rubber reinforcement of rigid plastics. By carefully controlled emulsion polymerization techniques, rubber particles have been obtained the interiors of which are replaced by a hard material. The replacement of much of the inner portion of the rubber can be accomplished without sacrifice in impact strength and with a gain in the other physical properties usually adversely affected by the rubber.

BRIEF DESCRIPTION OF THE DRAWINGS

The invention is illustrated in the accompanying drawings. In FIG. 1 is shown a prior art rubber particle with a grafted, hard outer coat. In FIG. 2 the rubber is in the form of a layer "sandwiched" between two hard polymers. FIG. 3 demonstrates the new "sandwich polymer" at work reinforcing the impact strength of a rigid plastic. FIG. 4 is a graph on which at a constant diameter of "sandwich polymer" particles (1 micron) the thickness of the rubber coating is plotted against the percent by weight of rubber replaced by the hard polymeric core.

DETAILED DESCRIPTION OF THE INVENTION

Figure 5:
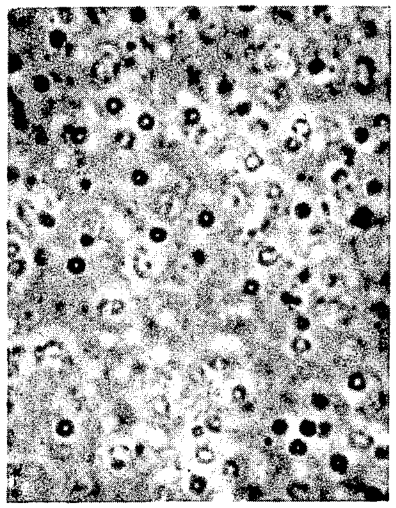
FIGS. 5 and 6 are photographs showing the multilayered structure of these new rubber sandwich polymers as verified by phase contrast studies (FIG. 5) and electron microscopy (FIG. 6).
Figure 6:
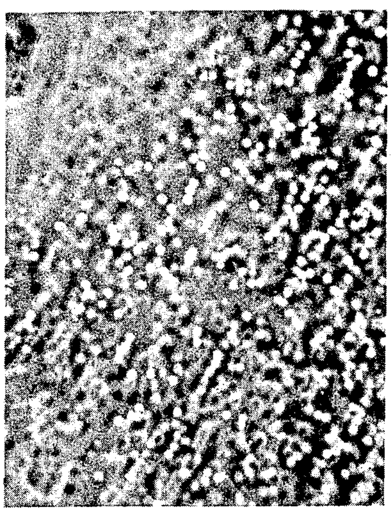

These multilayered graft copolymer particles are prepared by seeded emulsion polymerizations. Seeded polymerizations have long been used to produce emulsion particles of a larger size than can be obtained by a regular "one-shot" or one-step emulsion recipe. Successive polymerizations are carried out in the presence of a preformed particle, with the result that the original particle is enlarged.

In preparing the new multilayered particles of this invention, seed polymerizations are used but, instead of enlargement by the same monomer, a different monomer is employed and multilayer particles of different polymers are thus produced. The seed emulsions which contain the hard core polymer particles used in preparing the multilayer particles of this invention are themselves prepared by means of conventional, aqueous emulsion polymerization procedures of either the one-step or seeded type using emulsifiers and water soluble catalysts of the same type as will be described, hereinbelow, for the seed polymerization step of the subject process.

In conducting the seed polymerization step leading to the preparation of the multilayered particles of this invention, an aqueous emulsion containing about 2 to 95% by weight, of the seed polymer particles which will utimately comprise the hard core of these multilayered particles is admixed with about 5 to 98%, by weight, of a monomer or monomer mixture which will form their outer rubber layer. From about 0.05 to 1.0%, by weight, of a water soluble catalyst such, for example, as hydrogen peroxide, ammonium, sodium or potassium persulfate or a redox type such as mixtures of persulfates with alkali metal bisulfites, thiosulfates or hydrosulfites is introduced and the resulting mixture then heated at a temperature of from about 20 to 100° C. for a period of about 0.25 to 20 hours. The seed polymer emulsion should contain one or more anionic, non-ionic or cationic emulsifiers such, for example, as the alkyl carboxylic acid salts, the alkyl sulfate salts, the alkyl sulfonate salts, the alkyl sulfate salts, the alkyl sulfonate salts, the alkyl aryl ether alcohols, and the alkyl aryl polyether sulfate salts. The latter emulsifiers will, of course, have been present during the polymerization of the seed polymer emulsion. The concentration of emulsifier in the seed polymer emulsion is very critical. If there is too much present, new particles will be generated. If there is too little, the emulsion will coagulate. Thus, the surface tension of the seed emulsion should generally range from about 48 to 60 dynes per square centimeter, depending on the specific emulsion. After the polymerization has been run, an electron micrograph is often made to determine if the seed particles were successfully enlarged.

It is preferred, as aforesaid, that the hard core and rubber sandwich layer both be made by the emulsion polymerization techniques. The rubber-coated hard particles may then be blended with the rigid polymer by emulsion blending or mill processing. If one or more grafted topcoats are desired, they can also be added by seeded emulsion polymerization procedures. The product can then be used as either an impact plastic or an additive for rigid plastics. With this invention, enhanced impact strength has resulted when as little as 0.8% by weight of rubber is used.

Rigid plastics that can be reinforced by this improved method of rubber reinforcement are polyvinyl chloride (PVC), polystyrene (PS), polymethyl methacrylate (PMMA), co-poly(styrene acrylonitrile), polymethacrylonitrile (PMAN), and all the common rigid copolymers of these plastics, e.g., co-poly(vinyl chloride-vinylacetate), co-poly(methyl methylacrylate-ethyl acrylate, terpoly(methyl methacrylate-acrylonitrile-styrene).

The hard core of the new particles can be any polymer or copolymer having a glass transition temperature (Tg) above room temperature, i.e., about 25° C., that can be polymerized by free radical emulsion techniques (e.g., PVC, PS, PMMA, PMAN). Also applicable are the copolymers of vinyl chloride, styrene, methyl metacrylate, and methacrylonitrile with each other and with a minor proportion of one or more of such vinyl comonomers as ethyl acrylate, vinyl acetate, acrylonitrile, α-methyl styrene and other common vinyl monomers.

The rubber layer can be any polymer or copolymer having a Tg less than about 25° C. that can be polymerized by free radical emulsion techniques. The rubber layer should, preferably, be crosslinked so it can retain its size and shape during the polymer processing. This crosslinking can be achieved during the polymerization of the rubber layer if a divinyl or diene crosslinkable comonomer is included in the polymerization recipe, or, where such a crosslinkable comonomer is not present, crosslinking can be achieved subsequent to polymerization.

Examples of rubbers that can be used are the acrylic and butadiene rubbers including poly(1,3-butadiene) and polymers of the $C_2$–$C_8$ alkyl acrylates such as poly(butyl acrylate), poly(ethyl acrylate), poly(ethylhexyl acrylate), and poly(n-octyl acrylate) which are preferably crosslinked with small quantities of divinyl monomers such as divinyl benzene or 1,3-butylene dimethylacrylate. Also useful are copolymers of 1,3-butadiene and the $C_2$–$C_8$ alkyl acrylates with each other and with one or more of such vinyl monomers as styrene, acrylonitrile, vinyl acetate, methyl methacrylate, isoprene, chloroprene, ethylene and other common vinyl monomers.

If desired, additional coatings may be added. These outer hard coatings can be any of the materials chosen for the core but in any one particular example, this material does not have to be the same as that chosen for the core. Neither the core nor the outer hard coat has to be the same as the continuous phase, i.e., the ultimate rigid plastic, but it may be.

For purposes of this invention, it is convenient to express the relationship between the core size and the size of the rubber sandwich in terms of the proportion by weight of the core to the total weight of the (core+rubber), i.e., the final particle. FIG. 4 shows that if the outer diameter of the rubber is held constant, the thickness of the rubber layer decreases as the percentage of rubber replaced increases. The preferred level of percent rubber replaced, by weight, has been found to be about 3 to 90%. The preferred total amount of rubber in the continuous rubber-rigid polymer blend should be about 0.5 to 30% by total weight.

A preferred aspect of this invention is that the multilayered emulsion polymer particles are especially useful as impact additives and may also be used as processing aids for various polymers, notably polyvinyl chloride When added to polyvinyl chloride or to other rigid plastics at a 5–50% by weight level, as based on the total weight of the resulting mixture, an increase in the impact strength of the polyvinyl chloride, or other rigid plastic, is obtained along with an improved processability. As previously indicated, rubber reinforcement of rigid polymers such as polymers such as polyvinyl chloride or polystyrene has been conventionally accomplished by adding to the plastic, during processing, an additive which consists of a crosslinked rubber particle surrounded by a hard coating. With the novel rubber sandwich technique of this invention, however, it is possible to obtain improved impact strength in a manner which has distinct advantages as compared to the use of these conventional impact additives. For example, crosslinked rubbers are known to be incompatible with the rigid phase and this can lead to loss of clarity. The rubber sandwich polymers, on the other hand, contain less crosslinked rubber material for a given amount of additive, which results in a clearer material. There is, additionally, a cost advantage with the inventive sandwich polymer since the core can be made of a relatively cheaper material.

The following examples are given to illustrate this invention but not in any way to limit its scope.

The following table records the components and their relative proportions in the products of Examples 1 through 7, all of which are of the preferred type illustrated in FIG. 2.

It is to be noted that the glass transition temperature of all of the core polymers listed in this table is above 25° C. while that of all of the rubber "sandwich layer" polymers in this table in less than 25° C.

| Example No. | Core polymer | Rubber "sandwich layer" polymer | Outer coating polymer | Percent composition by weight | Percent rubber replaced by core [1] |
|---|---|---|---|---|---|
| 1 | Polyvinyl chloride | Copolymer 98%, 2% butylacrylate butylene dimethacrylate. | Copolymer 90%, 10% methylmethacrylate ethyl acrylate. | 50% outer coating; 48.5% rubber; 1.5% core | 3 |
| 2 | do | do | do | 50% outer coating: 40% rubber; 10% core | 21 |
| 3 | do | do | do | 50% outer coating; 30% rubber; 20% core | 40 |
| 4 | do | do | do | 50% outer coating; 15% rubber; 35% core | 70 |
| 5 | do | do | Polyvinyl chloride | 50% outer coating; 25% rubber; 25% core | 50 |
| 6 | do | do | do | 50% outer coating; 8% rubber; 42% core | 84 |
| 7 | Polystyrene | Copolymer 80%/20%, butadiene/styrene. | Polystyrene | 50% outer coating; 17% rubber; 33% core | 66 |

[1] Calculated by percent rubber replaced $= \frac{\text{wt. core}}{\text{wt. core+rubber}}$

EXAMPLE 1

Part 1—Preparation of PVC core

Into a 1 quart "champagne bottle" were placed all the following except the vinyl chloride.

290 gms. deionized water 5 ml. of 5% sodium bicarbonate ($NaHCO_3$)
46 ml. of 2% ammonium persulfate $(NH_4)_2(S_2O_8)$
29.2 ml. of 10% sodium salt of 2-ethylhexyl-sulfate
256 gms. vinyl chloride The bottle was chilled to 0° C. and all the vinyl chloride was added (this procedure was followed in all examples). The bottle was capped and heated and rotated at 18 r.p.m. for six hours at 46° C.

A PVC emulsion of 0.3 micron size was obtained.

Part 2—Growth of core from 0.3μ to 0.6μ with acrylic rubber

The following reactants were placed in a 1 quart bottle which was capped, heated and rotated for six hours at 70° C.

42 gms. of PVC latex (part 1) 40% solids
30 ml. of 2% potassium persulfate
120 gms. butylacrylate
2.4 gms. butylene 1,3-dimethacrylate
200 gms. water A latex of about 0.6 micron size was obtained with a solids content of 30%.

Part 3—Growth of 0.6μ latex to 1 micron with acrylic rubber

The following reactants were placed in a 1 quart bottle which was capped, heated and rotated as before for seven hours at 70° C.

85 gms. of latex from part 2, 30% solids
24 ml. of 2% potassium persulfate
188 gms. of water
94 gms. of butylacrylate
1.92 gms. butylene 1,3-dimethacrylate Latex solids found 31%.
Latex particle size approx. 1 micron.

Part 4—Growth of PMMA on core+rubber

The following reactants were placed in a 1 quarter bottle which was capped, heated and rotated for one hour at 70° C.

200 gms. of latex from part 3, 31% solids
14 ml. of 2% potassium persulfate
200 ml. of water
57 gms. methyl methacrylate
3 gms. ethyl acrylate After cooling the latex was filtered through flannel.
Found solids 25%, particle size approx. 1.2 microns.
On examination by phase contrast microscopy at 1200× a 0.3 micron core could be seen surrounded by an acrylic shell (PMMA and PBA have about the same refractive under and show as one layer).
The latex was tray-dried to yield a white powder.

EXAMPLE 2.—20% RUBBER REPLACEMENT

Part 1

A 0.3 micron PVC emulsion was prepared as in Example 1, part 1.

Part 2—Growth of PVC from 0.3μ to 0.6μ

The following reactants were placed in a 1 quart bottle which was heated and rotated at 45° C. for six hours.

45 gms. 0.3μ PVC latex (part 1), 40% solids
21 ml. 2% ammonium persulfate
2.5 ml. of 5% sodium bicarbonate
300 gms. water
0.94 ml. of 1% soln of sodium bis(tridecyl) sulfosuccinate
144 gms. vinyl chloride The unreacted monomer was vented and the latex was filtered through flannel. Latex of 0.6 micron size was obtained at 17% solids.

Part 3—Growth of 0.6μ PVC to 1μ with acrylic rubber

The following reactants were placed in a 1 quart bottle which was heated and rotated at 70° C. for five hours.

147 gms. 0.6μ PVC latex from part 2, 17% solids
24 ml. of 2% potassium persulfate
133 gms. of water
93 gms. butyl acrylate
1.9 butylene dimethacrylate Latex solids 26.6%, particle size 1 micron.

Part 4—Growth of PMMA coating on 0.6μ PVC core+rubber

The following reactants were placed in a 1 quart bottle which was heated and rotated one hour at 70° C.

250 gms. latex from part 3, 26.6% solids
17 ml. of 2% potassium persulfate
188 gms. water
62 gms. methyl methacrylate
3.4 gms. ethyl acrylate A 1.2 micron size latex was obtained of 25% solids. Phase contrast microscopy at 1200× showed a 0.6μ PVC core surrounded by the acrylic coating.
The product was tray dried to obtain a white powder.

EXAMPLE 3.—40% RUBBER REPLACEMENT

Part 1

Preparation of core of 0.3μ PVC seed same as Example 1, part 1.

Part 2

Same as Example 2, part 2.

Part 3—Growth of 0.6μ PVC latex to 0.75μ

The following reactants were placed in a 1 quart bottle which was heated and rotated at 45° C. for 4 hours and 15 min.

246 gms. 0.6 PVC latex, 9.9% solids
1.8 ml. of 1% sodium bis(tridecyl) sulfosuccinate
289 gms. water
7 ml. 2% potassium persulfate
66 gms. vinyl chloride A latex with particles of approx. 0.75 micron size was obtained at 9% solids.

Part 4—Growth of 0.75μ PVC to 1μ with acrylic rubber

The following reactants were placed in a 1 quart bottle which was heated and rotated at 70° C. for three hours as usual.

410 gms. of 0.75μ PVC from part 3, 9% solids
51 gms. butyl acrylate
1.06 gms. butylene 1,3-dimethacrylate
25 gms. water
13 gms. 2% potassium persulfate A latex of 16% solids was obtained.

Part 5—Growth of PMMA on 0.75μ PVC core+rubber

The following reactants were placed in a 1 quart bottle which was heated and rotated for one hour at 70° C.

400 gms. 1.0μ seed from part 4, 16% solids
140 gms. water
58 gms. methyl methacrylate
6.4 gms. ethyl acrylate
16 gms. 2% potassium persulfate The latex obtained had a size of 1.1–1.4 microns and a solids content of 21%. The latex was tray dried and a white powder was obtained.

EXAMPLE 4.—70% REPLACEMENT

Part 1

Same as Example 1, part 1.

Part 2

Same as Example 2, part 2,

Part 3—Growth of 0.6$\mu$ PVC to 0.9$\mu$

The following reactants were placed in a 1 quart bottle which was heated and rotated at 45° C. for 4 hrs. and 45 min.

188 gms. 0.6$\mu$ PVC latex, 12.3% solids
1.7 ml. of 1% sodium bis(tridecyl) sulfosuccinate
332 gms. water
10.3 ml. of 2% potassium persulfate
113 gms. vinyl chloride The latex was filtered, solids 8.6%.

Part 4—Growth of acrylic rubber on 0.9$\mu$ PVC latex

Reactants were placed in 1 quart bottle, heated and rotated 70° C. for 3 hrs. and 45 min.

580 gms. of latex from part 3
20 gms. butyl acrylate
0.4 gm. butylene 1,3-dimethacrylate
5 ml. 2% potassium persulfate The latex was filtered and the solids were 6.8%.

Part 5—Growth of PMMA on acrylic rubber+core

Reactants were placed in 1 quart bottle, heated and rotated for one hour at 70° C.

524 gms. latex from part 4, 6.8% solids
32.1 gms. methyl methacrylate
3.5 gms. ethyl acrylate
8.7 ml. 2% potassium persulfate Latex filtered, found solid 12.5%.

Product was tray dried to give a white powder. Latex particle size about 1 micron.

EXAMPLE 5.—50% REPLACEMENT

Part 1—Growth of acrylic rubber on 0.7$\mu$ PVC core 273 gms. 0.7$\mu$ PVC latex, 32% solids
89 gms. butyl acrylate
2 gms. butylene 1,3-dimethacrylate
124 gms. water
23 ml. 2% potassium persulfate The above reactants were placed in a 1 quart bottle and heated and rotated three hours at 70° C.

Solids found 35.8%.

Part 2—Growth of PVC on core+rubber 178 gms. rubber on core from part 1, 35.8% solids
297 gms. water
8.7 gms. 2% potassium persulfate
8.2 ml. of 1% sodium bis(tridecyl) sulfosuccinate
55 gms. vinyl chloride The above reactants were placed in a 1 quart bottle and heated and rotated for 4 hours at 50° C. Solids found 31.2%. The latex was spray dried to give a white powder.

EXAMPLE 6.—84% REPLACEMENT

Part 1—Growth of acrylic rubber on 0.7$\mu$ PVC core 303 gms. 0.7$\mu$ PVC latex, 32% solids
20 gms. butyl acrylate
0.4 gm. butylene 1,3-dimethacrylate
172 gms. water
5 ml. 2% potassium persulfate The above reactants were placed in a 1 quart bottle and heated and rotated for three hours at 70° C.

Found solids 20.5%.

Part 2—Growth of PVC on rubber+core 310 gms. core+rubber from part 1, 20.5% solids
165 gms. water
8.7 ml. 2% potassium persulfate
8.2 ml. 1% sodium bis(tridecyl) sulfosuccinate
55 gms. vinyl chloride The above reactants were heated with agitation for 4 hrs. at 50° C. The latex was filtered and spray dried.

EXAMPLE 7.—66% RUBBER REPLACED

Part 1—0.4$\mu$ polystyrene emulsion

The following latex was prepared under the usual conditions, rotating for 9 hrs. at 80° C.

189 gms. styrene
264 gms. water
55 ml. 2% potassium persulfate
81 ml. 1% sodium bis(tridecyl) sulfosuccinate Solids found, 31%.

Part 2—Butadiene-styrene rubber on PS core

Rotation at 70° C. for 20 hrs.

200 gms. PS seed latex from part 1
112 gms. water
34 ml. 2% potassium persulfate
0.1 ml. t-dodecylmercaptan
9 gms. styrene
52 gms. butadiene
18.6 ml. 1% sodium bis(tridecyl) sulfosuccinate Found solids, 20.3%.

Calculated butadiene conversion about 50%.

Part 3——PS outer coat

Rotation for 9 hrs. at 80° C.

380 gms. seed from part 2
3.5 ml. 1% sodium bis(tridecyl)sulfosuccinate
70 gms. styrene
110 gms. water
17.5 ml. 2% potassium persulfate Found solids 27%.

The material was tray dried and ground in a Waring Blendor to produce a white powder.

EVALUATION RESULTS (EXAMPLES 1–4)

The polymeric products prepared in Examples 1–4 were milled with commercial polyvinyl chloride (1) on a two-roll mill for 3 minutes at 360/350° F. Three phr. of a tin mercaptide stabilizer sold as Thermolite 31 (M & T Chemicals) and 0.5 phr. calcium stearate were used as stabilizers. The following results were obtained.

| Example No. | Percent modifier in PVC (phr.) | Tensile strength p.s.i.[2] | Tensile impact ft. lbs./in.[2] [a] |
|---|---|---|---|
| PVC control [1] | 0 | 7,800 | 75 |
| 1 | 10 | 6,870 | 155 |
| 1 | 7 | 7,000 | 132 |
| 2 | 10 | 6,750 | 155 |
| 3 | 15 | 6,400 | 154 |
| 3 | 10 | 6,600 | 131 |
| 4 | 15 | 7,400 | 122 |
| 4 | 10 | 7,500 | 93 |

[1] Mn 44,000; M.W. 86,000; Rv 2.11 at 1 gm./dec. in cyclohexanone at 30° C.
[2] Modified ASTM D–1708 procedure, length of flat section 0.5 instead of 0.876; effective speed A.
[a] ASTM procedure D–1822.

The polymeric products from Examples 5 and 6 were included in the following formulation:

100 Commercial PVC (the same control as for evaluation of the products of Examples 1–4)
3 Thermolite T–31 (M & T Chemicals)
2 An acrylic processing aid comprising a methyl methacrylate:ethyl acrylate copolymer sold as K–120N (Rohm & Haas)

1 A wax lubricant sold as Wax E (Hoechst)

X Experimental Modifier

The formulations were extruded through a 1 inch diameter Modern Plastics Machinery extruder using a 2.76:1 compression screw with a 12 inch sheet die to produce a 15 mill film. Tensile strength and impact were measured by the same ASTM procedures cited above. Elongation and elastic modules were measured by ASTM procedure D–882.

| Example No. | Parts modifier | Melt temperature, ° F. | Pressure | Tensile strength, p.s.i. | Percent elongation | Elastic modulus ×10⁵ lbs./sq. in. | Tensile impact, ft. lbs./in.² |
|---|---|---|---|---|---|---|---|
| PVC control | 0 | 380 | 3,300 | 8,234 | 200 | 1.82 | 32.4 |
| 6 | 10 | 375 | 3,450 | 8,807 | 89 | 1.89 | 36.7 |
| 6 | 15 | 370 | 3,150 | 9,045 | 101 | 1.72 | 38.5 |
| 5 | 5 | 375 | 3,900 | 9,062 | 99 | 1.76 | 38.9 |
| 5 | 10 | 375 | 4,100 | | | | 41.4 |

EXAMPLE 8.—IMPACT-MODIFIED POLY-(METHYL METHACRYLATE)

The 40% replacement sandwich prepared in Example 3 was milled at 15 phr. with DuPont Lucite 147 (polymethyl methacrylate). Milling conditions (330° F.—control 5 minutes—experimental sample 12 minutes. Tensile strength and impact were measured by the same procedures used in evaluating the products of the previous examples, and the results are tabulated below.

EXAMPLE 9.—"SANDWICH" IMPACT MODIFIER USED WITHOUT GRAFTED TOPCOAT

Sixty-three grams of the latex prepared in Example 1, part 3 (24% solids) were blended with 300 grams of dry suspension polyvinyl chloride. The blend was air-dried to remove the water contained in the latex. The dried composition was a 95% suspension PVC and 5% butyl acrylate rubber (3% of rubber replaced with PVC core). The sample was milled and tested against the unmodified PVC control by the same procedures as in the previous evaluations, with the following results:

| Sample | Tensile, p.s.i. | Tensile impact, ft lbs./in. |
|---|---|---|
| Du Pont Lucite 147 (PMMA) | 9,250 | 8.1 |
| 15 parts Example 3–85 parts Lucite 147 | 9,000 | 22.0 |
| 620 PVC control | 7,600 | 104.0 |
| 95% SCC 620–5% Example 9 | 6,760 | 174.0 |

What is claimed is:

1. The method of making three-layered, rubber-containing polymer particles which comprises first polymerizing, by an emulsion technique, a monomer or mixture of monomers which when polymerized have a glass transition temperature above about 25° C. said monomers being selected from the group consisting of vinyl chloride, methyl methacrylate, methacrylonitrile and styrene as well as mixtures of one or more of the latter monomers with each other and with a minor proportion of one or more other vinyl monomers; thereafter polymerizing, by the use of a seeded emulsion technique, on the polymeric core thus formed a monomer or monomer mixture capable of forming cross-linked rubber and having when polymerized a glass transition temperature less than about 25° C. and in any event below that of the polymeric core said monomers being selected from the group consisting of 1,3-butadiene and the $C_2$–$C_8$ alkyl acrylates and mixtures of the latter monomers with each other and with other vinyl monomers; and, then polymerizing, by means of a seeded emulsion technique, as an outer coating around the rubber polymer layer, a monomer or mixture of monomers which when polymerized have a glass transition temperature above about 25° C. said monomers being selected from the group consisting of vinyl chloride, methyl methacrylate, methacrylonitrile and styrene as well as mixture of one or more of the latter monomers with each other and with a minor proportion of one or more other vinyl monomers.

2. A three-layered, rubber-containing polymer comprising from about 2% to 95%, by weight, of a polymeric core derived from a monomer selected from the group consisting of vinyl chloride, methacrylonitrile, methyl methacrylate, styrene and mixtures of the latter monomers with each other and with one or more other vinyl monomers; from about 5% to 98% by weight of a crosslinked rubber-type polymer coating said core, said rubber-type polymer being derived from a monomer selected from the group consisting of 1,3-butadiene and the $C_2$–$C_8$ alkyl acrylates and mixtures of the latter monomers with each and with other vinyl monomers; and, up to about 50%, by weight, of a polymeric outer coating derived from a monomer selected from the group consisting of vinyl chloride, methacrylonitrile, methyl methacrylate, styrene and mixtures of the latter monomers with each other and with other vinyl monomers.

References Cited

UNITED STATES PATENTS

| | | | |
|---|---|---|---|
| 2,614,089 | 10/1952 | Harrison et al. | 260—29.7 |
| 2,711,400 | 6/1955 | Harrison et al. | 260—45.5 |
| 3,397,165 | 8/1968 | Goodman et al. | 260—29.7 |
| 3,426,101 | 2/1969 | Ryan et al. | 260—876 |
| 3,458,603 | 7/1969 | Griffin et al. | 260—881 |
| 3,502,745 | 3/1970 | Minton | 260—878 |

JOSEPH L. SCHOFER, Primary Examiner

R. A. GAITHER, Assistant Examiner

U.S. Cl. X.R.

260—29.7, 876, 881, 884, 885, 886